United States Patent
Murphy (10) Patent No.: US 7,258,305 B1
(45) Date of Patent: Aug. 21, 2007

(54) SPACE BASED CHANGE DETECTION USING COMMON GROUND TRACK CONSTELLATIONS CAPABLE OF BEING CONFIGURED FOR MULTI-MANIFEST LAUNCHES

(75) Inventor: John H. Murphy, Ellicott City, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 198 days.

(21) Appl. No.: 11/086,335

(22) Filed: Mar. 23, 2005

Related U.S. Application Data (60) Provisional application No. 60/555,299, filed on Mar. 23, 2004, provisional application No. 60/555,294, filed on Mar. 23, 2004.

(51) Int. Cl.
  *B64G 1/10* (2006.01)
(52) U.S. Cl. .................................. 244/158.4
(58) Field of Classification Search ............. 244/158.4; 455/12.1, 13.1, 427; 250/334, 201.5; 342/352
  See application file for complete search history.

(56) References Cited

U.S. PATENT DOCUMENTS

| | | | |
|---|---|---|---|
| 3,243,706 A * | 3/1966 | Grisham .................. | 244/158.4 |
| 3,497,807 A * | 2/1970 | Newton ...................... | 455/13.1 |
| 5,379,065 A * | 1/1995 | Cutts ........................... | 348/269 |
| 5,420,789 A * | 5/1995 | Fulton ......................... | 250/334 |
| 5,551,624 A * | 9/1996 | Horstein et al. ........... | 455/12.1 |
| 5,906,337 A | 5/1999 | Williams et al. | |
| 5,971,324 A | 10/1999 | Williams et al. | |
| 6,102,335 A * | 8/2000 | Castiel et al. ............ | 244/158.4 |
| 6,198,907 B1 | 3/2001 | Torkington et al. | |
| 6,317,583 B1* | 11/2001 | Wolcott et al. ............ | 455/12.1 |
| 6,479,808 B1* | 11/2002 | Schwemmer ............ | 250/201.5 |
| 6,502,790 B1 | 1/2003 | Murphy | |
| 6,695,260 B2* | 2/2004 | Castiel et al. ............ | 244/158.4 |
| 2002/0160710 A1* | 10/2002 | Castiel et al. .............. | 455/12.1 |

* cited by examiner

*Primary Examiner*—Rob Swiatek
(74) *Attorney, Agent, or Firm*—Birch, Stewart, Kolasch & Birch, LLP

(57) ABSTRACT

A new approach for designing satellite constellations whereby the satellites are distributed into contiguous groups forming longitudinal lengths at least equal to 360 degrees. Gaps between the contiguous groups are uniformly distributed along the tracks. These contiguous groups of satellites may be populated by having multiple satellites onboard a single launch vehicle, whereby the satellites are nested into multiple common ground track sub-constellations to form a constellation with multiple common ground tracks.

34 Claims, 4 Drawing Sheets

SPACE BASED CHANGE DETECTION USING COMMON GROUND TRACK CONSTELLATIONS CAPABLE OF BEING CONFIGURED FOR MULTI-MANIFEST LAUNCHES

CROSS REFERENCE TO RELATED APPLICATION

The present application claims the benefit of U.S. Provisional Patent Application Nos. 60/555,299 and 60/555,294, both filed on Mar. 23, 2004, the entire contents of both which are hereby incorporated by reference.

BACKGROUND OF THE INVENTION

1. Field of the Invention

This invention relates generally to satellite constellations and more particularly to common ground track (CGT) satellite constellations with concentrated satellite distributions in contiguous groups and CGT satellite constellations configured for multi-manifest launches.

2. Description of Related Art

Figure 1:
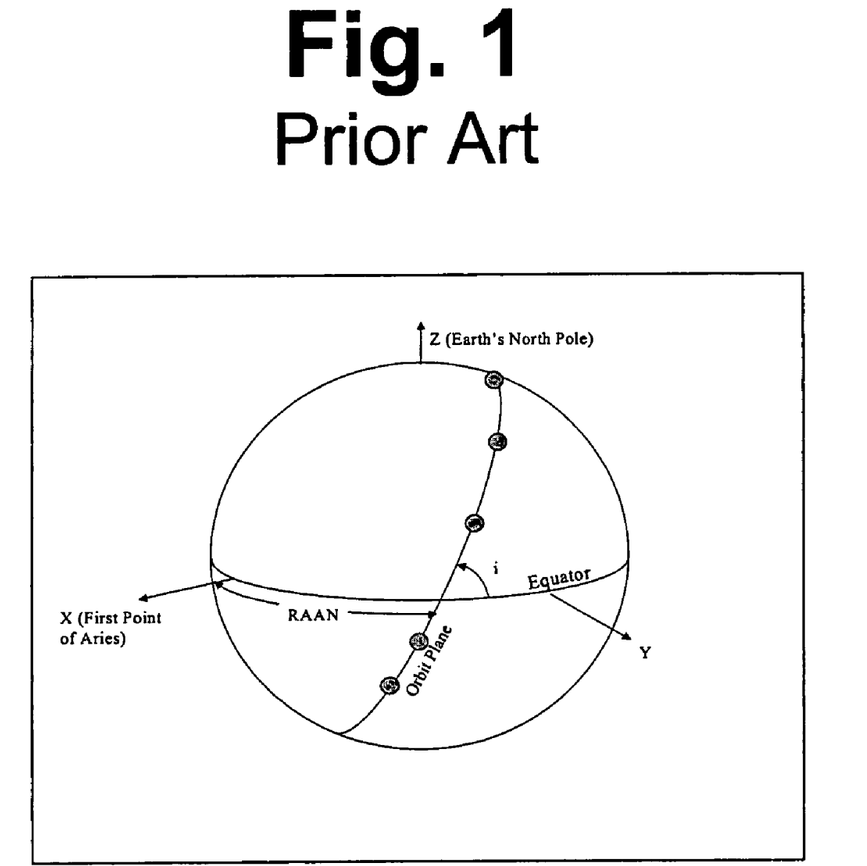
FIG. 1 is illustrative of a conventional orbital plane.

Most satellite systems that are used for reconnaissance have not been designed with the object of performing change detection with minimal blurring and distortion. For example, as shown in FIG. 1, existing satellite systems are generally organized into orbital planes, wherein a plane is uniquely defined by (1) an inclination angle, i, relative to the Earth's equator and (2) an angle of the Right Ascension of the Ascending Node, RAAN. Orbital parameters such as these are used to describe a satellite's orbit and a constellation's configuration. For instance, the inclination, i, is a constant defining the angle at which the orbital plane intersects the equator. Likewise, the RAAN defines an angle between a non-rotating celestial reference, i.e., the first point of Aries, and the line of nodes. The line of nodes is defined by a line formed using the intersection of an orbital plane and the plane of the equator. The line of nodes provides an orbit orientation. As such, all satellites with common values for i and RAAN are said to be in the same orbital plane.

However, a typical problem with satellites organized into the same orbital plane is that the ground tracks/paths, i.e., the movement of beams across the surface of the earth, are typically not common. In other words, different ground tracks are typically drawn out with successive satellites.

Figure 2:
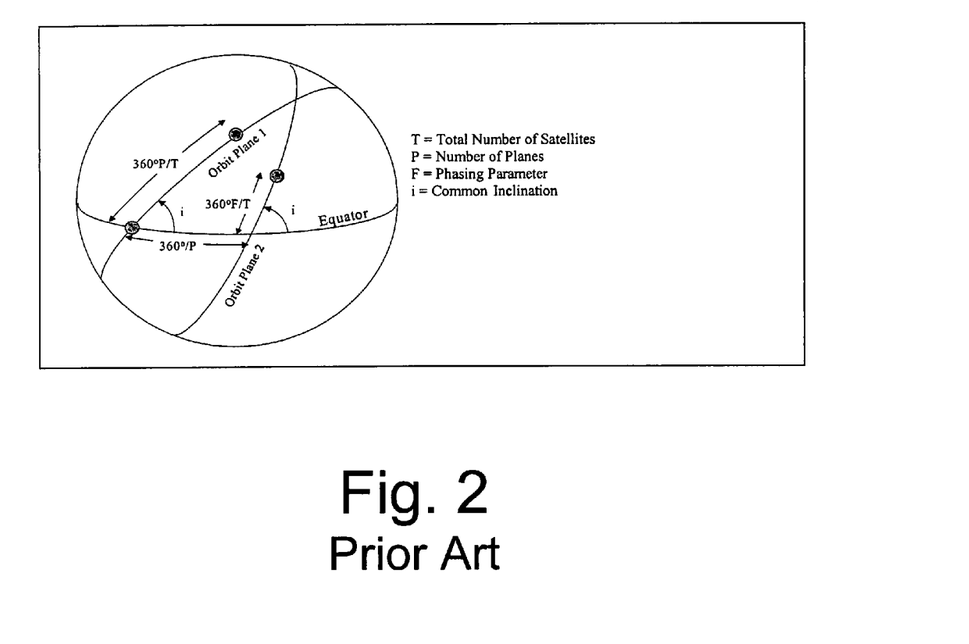
FIG. 2 is illustrative of a conventional Walker constellation.

Most existing satellite constellations are based on a type of configuration known as the Walker orbit configuration, which is illustrated in FIG. 2. This Walker type orbit configuration is based on a globally symmetrical collection of satellites. Typically, the satellites in a Walker orbit are organized into planes having common values for inclination and right ascension of the ascending node. This type of configuration is motivated in part by the larger costs associated with placing satellites into different orbital planes. For instance, it is cheaper to have multiple satellites placed into a single plane from a single launch vehicle. As such, Walker configurations consist of multiple satellites in a single plane.

However, such Walker configurations are sub-optimal configurations because they fail to provide minimal satellite counts and high revisit rates to particular regions on the earth. Furthermore, Walker obits are restricted to having a phasing parameter, F, that must be an integer in the range of 0 and P−1, where P represents the number of planes being used.

In addition, as shown in FIG. 2, Walker configurations consist of a plurality of equally spaced satellites having circular orbits with particular orbital inclinations. Such Walker configurations are defined by a three integer code T/P/F, where T represents the total number of satellites in the pattern, P represents the number of planes between which the number of satellites are equally divided, and F is a measure of the relative phasing of satellites in the adjacent planes. The inclination angle, i, of all the orbital planes is relative to a reference plane that is typically the equator of the earth.

In FIG. 2, a Walker configuration of satellites consists of a plurality of inclined planes, i.e., non-polar satellite orbital planes, i.e., planes 1 and 2, which cross the equator at an angle i, an inclination angle that is common to all planes in the constellation. In a Walker configuration, all of the orbital planes have an equal planar spacing, i.e., 360°/P, where again P is equal to the number of orbital planes. Further, all of the satellites are equally spaced along the respective orbital plane, e.g. orbital plane 1, by 360° P/T, where again T is the number of satellites. The phasing difference between satellites in adjacent planes 1 and 2, which is referenced against the equator, is 360° F./T, where again F is the phasing parameter which here consists of an integer. As a result, for Walker orbits, the ground tracks/paths of the collection of satellites are seldom common.

Figure 3:
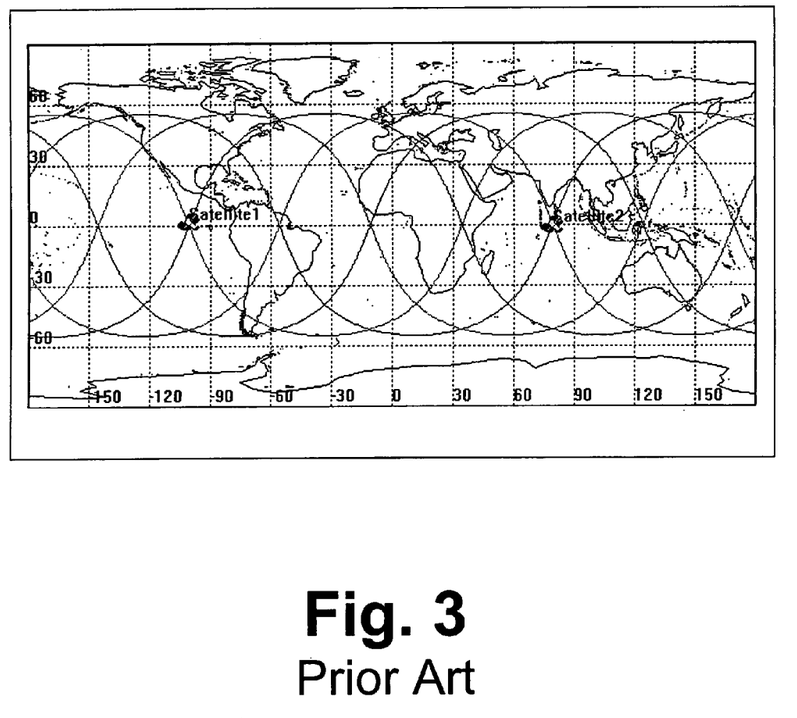
FIG. 3 illustrates ground tracks of a 2/1/0 constellation as defined in FIG. 2.

These distinctive (uncommon) ground tracks/paths of the Walker configuration are illustrated in FIG. 3. In FIG. 3, the orbits for a 2/1/0 Walker orbit is illustrated. The 2/1/0 represents two satellites in one orbital plane and no phasing angle due to the fact that only one plane is being used. The orbital altitude selected in the FIG. 3 example is set to 10,349.56 km because at this altitude the ground track of any satellite retraces itself only once every 24 hours. In other words, in this example, the same path, i.e., a common ground track, is taken at most only once in a 24-hour period.

Furthermore, observe that there are six distinctive ground traces in FIG. 3: there are three ground traces for satellite 1 and three other ground traces for satellite 2. The selection of the altitude of 10,349 Km causes the satellite ground traces to close upon themselves after three traces around the earth. In other words, the satellites in FIG. 3 each traverse the earth three times, cutting out a distinctive ground track each time, before they can begin to retrace a previous ground track. Ground traces close upon themselves when the ground tracks begin to repeat/retrace. However, the closure of the ground traces upon themselves in a finite number of orbits is not necessarily a requirement for constellation design.

As noted above, in FIG. 3, after three ground traces the ground tracks close on themselves and correspond to the ground track for satellite 1. Likewise, another three ground traces close on themselves and correspond to the ground track for satellite 2. Although these two satellites, satellite 1 and satellite 2, are in a common orbital plane and form a symmetrical constellation, which is typical of Walker orbit constellations, satellite 1 and satellite 2 fail to have common ground tracks. Instead, at the 10,349.56 km altitude, each satellite has 3 distinctive ground traces covering $2\pi$ radians (360°) of longitude.

Imagine if detection images were to be taken from both satellite 1 and satellite 2. When these images are actually taken of a common region of the earth, blurring and distortion of the images will occur because the two satellites follow different ground tracks/paths. A technique which has been used to remove these defects from the images is called morphing. For example, morphing is used to stretch and twist the images to compensate for the blurring and distortion.

Furthermore, the conventional practice of populating constellations at equal satellite spacings, as done in Walker constellations, often leads to poor coverage and usually complicated handoff procedures. For small levels of coverage (number of satellites in-view of targets), an uniform distribution of satellites over common ground traces result in sparse distributions along the track in the constellation. Sparse distributions along the ground track fail to ensure near optimal arrangement of satellites (hexagonal packing) for the desired level of coverage.

Furthermore, sparse distribution of satellites along the ground track forces frequent, inefficient hand-off from a satellite on one ground trace to a satellite on another ground trace. Also, the inefficient hand-off between ground traces results in discontiguous coverage along the ground track and large angular diversity in the ground coverage. For example, coherent contiguous SAR change detection becomes problematic. Although SAR change detection can be performed in the above constellations, it is done at an undesirably low revisit rate. Moreover, the determination of the hand-off timing and pairing of satellites becomes complex.

Furthermore, all variants of the preferred common ground track (CGT) constellation that have been investigated to date assume that there is a single satellite in any orbital plane. This assumption and the orbital restrictions in phasing between satellites has lead to a single ground track that may be retraced numerous times if desired. However, a problem with having a single satellite per orbital plane is that the cost to launch the satellites is directly related to the number of satellites and conventionally only one satellite can typically be carried per launch vehicle.

Although the cost to launch a single satellite per orbital plane may be undesirable, there are numerous performance benefits associated with the CGT approach to constellation design. For instance, for space-based radar, these benefits include high-precision imagery and high-level Digital Terrain Elevation Data (DTED) mapping for longer periods at high satellite revisit rates. For telecommunications networks, the benefits may include well-defined handoff routines, and optimally organized satellite placement over the earth.

As such, a non-uniform distribution of satellites in a common ground track (CGT) constellation is needed which can overcome the above problems associated with sparse distribution of satellites along the ground tracks.

In addition, there is a further need to arrange satellites in CGT constellations for at least telecommunication access, high-precision imagery, and high-level DTED mapping of specified regions of the earth at high revisit rates whereby such satellites may be placed into orbit by launch vehicles each carrying multiple satellites.

SUMMARY OF THE INVENTION

An aspect of the present invention is to provide a non-uniform distribution of satellites in a common ground track (CGT) constellation.

Another aspect of the present invention is to provide concentration of satellite distributions in contiguous groups forming longitudinal lengths at least equal to 360 degrees with gaps uniformly distributed along the tracks.

Still further, an aspect of the present invention is to configure CGT constellations so that they may be populated with multiple satellites per launch vehicle.

Furthermore, an aspect of the present invention is to provide a method for nesting multiple CGT sub-constellations to form a constellation with multiple common ground tracks that can be populated by multiple satellites per launch vehicle.

These and other aspects of the present invention are at least achieved by a group of satellites designed to provide either continuous world-wide or regional coverage for applications including, but not limited to, high-precision change detection imaging by successive satellites in orbit around the earth, in the detection of underground facilities activities and slow moving objects, for example.

Further scope of applicability of the present invention will become apparent from the detailed description provided hereinafter. It should be understood, however, that the detailed description and specific embodiments, while disclosing the preferred embodiments of the invention, are being provided by way of illustration only, since various changes and modifications coming within the spirit and scope of the invention will become apparent to those skilled in the art from the following detailed description.

BRIEF DESCRIPTION OF THE DRAWINGS

The present invention will become more fully understood when the accompanying drawings are considered together with the detailed description provided hereinafter and which are provided by way of illustration only, and thus are not meant to be limitative of the invention, and wherein.

DETAILED DESCRIPTION OF PREFERRED EMBODIMENTS

For a general understanding of the features of the present invention, reference is made to the drawings and Tables, wherein like reference numerals/characters are used throughout to identify identical or similar elements. While the present invention will be described in terms of an illustrative embodiment or embodiments, it will be understood that the invention is adaptable to a variety of constellation design techniques, such that the present invention is not necessarily limited to the particular embodiment or embodiments shown and described herein. To the contrary, the following description is intended to cover all alternatives, modifications, and equivalents, as may be included within the spirit and scope of the invention.

A new procedure for designing satellite constellations capable of at least performing spaced-based global change detection are presented herein which are based on common ground tracks/paths. These new satellite constellation designs can do away with morphing techniques by providing enhanced images that are substantially taken along the same path each time. Such satellite constellations may include a total satellite count that is as good as, and more often are fewer than, prior art constellations.

In fact, such new satellite constellation designs are organized along common ground tracks (CGT) so as to be able to perform high-precision change detection imagery for longer periods of time. Such high-precision change detection imaging by successive satellites in orbit around the earth is particularly useful in the detection of underground facilities activities and the detection of moving objects, for example. Such high-precision imagery can be captured via the satellites by using any number of conventional change detection means typically used in satellite technology. Such change detection means may include SAR, optical, UV, infrared or other imaging systems or combinations thereof.

Furthermore, the unique satellite constellations as provided herein may be launched into orbit by any conventional launch vehicle capable of doing the same. The satellites may be placed into orbit from different launch vehicles or the satellites may all be placed from the same launch vehicle or any combination thereof. Preferably, the satellites are placed into orbit using launch vehicles having the capacity to carry multiple satellites each. Using one launch vehicle to place multiple satellites into orbit reduces the number of launch vehicles needed overall to form a constellation.

Low Earth Orbit (LEO) CGT constellations fed by multi-manifest launches are surely attractive candidates for space-based radar and telecommunications applications from a cost and performance perspective.

In the case of LEO space-based radar and telecommunication satellites, the size and mass of the satellites is such that more than one satellite may fit within a single launch vehicle's fairing and inserted into the desired orbit. As with ordinary constellations, packaging multiple satellites into a single launch vehicle leads to a constellation cost savings.

The present invention exemplifies how to arrange CGT sub-constellations to form a new class of CGT constellations such that launch cost savings may be accrued by launching multiple numbers of satellites per launch vehicle. In some ways, the present invention may be viewed as a marriage of classical (inertial plane oriented) constellation design with CGT constellation design. However, since the phase relationships between satellites follows the CGT approach, this new constellation design appears to be a novel variant of CGT constellations more so than some variant to classical constellation design.

Whichever way the satellites reach orbit, once in orbit, such satellite constellations are preferably provided with conventional station-keeping arrangements to ensure that they follow the desired ground tracks/paths. Station-keeping is required in order to minimize the amount of drifting typically encountered by satellites due in part to the elliptical shape of the earth. This drifting of the satellites is generally a non-linear effect. Station-keeping of the herein described new constellation designs helps to ensure the common ground tracks/paths.

Normal practice in CGT design is to collect the satellites into groups forming longitudinal lengths at least equal to 360 degrees.

One way to maintain the level of coverage is to increase the spacing (double, triple, etc.) between satellites in the overlap region to compensate for the level changes. This approach may be undesirable because it increases the satellite revisit rate (double, triple, etc.). Furthermore, it complicates the satellite distribution and handoff procedures that one must maintain. Other methods to maintain the level of coverage are possible, but whatever approach is used chances are that many of the benefits derived from the CGT design approach may be lost or compromised by such approach.

Figure 4:
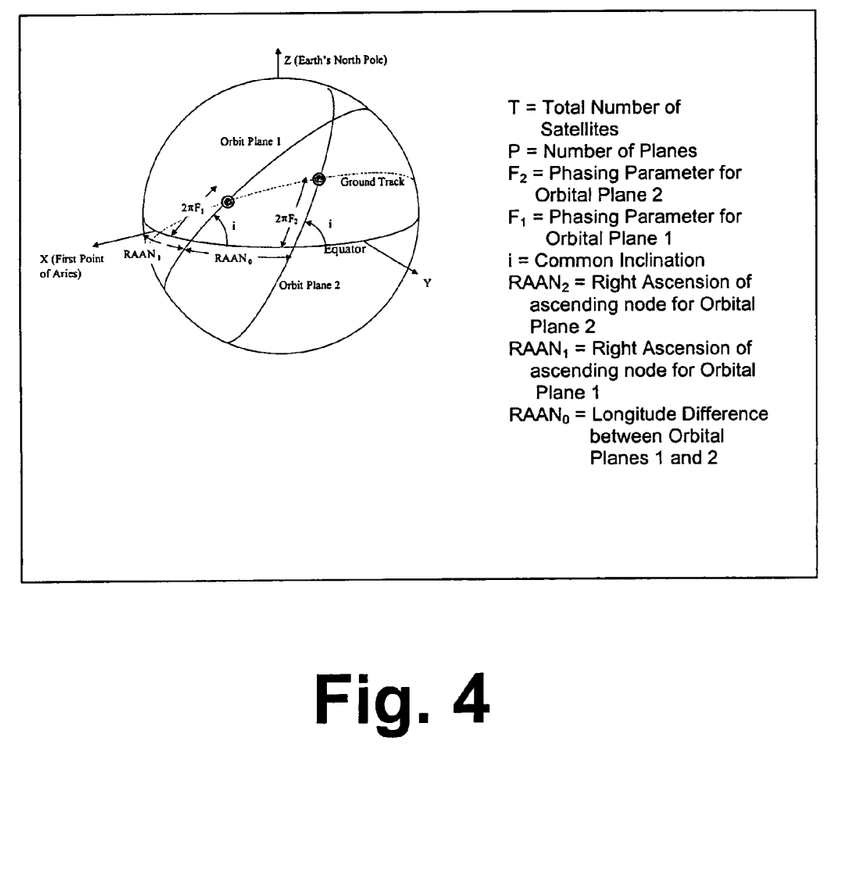
FIG. 4 illustrates orbit definitions for common ground track constellations in accordance with a preferred embodiment of the present invention.

In accordance with a preferred embodiment of designing CGT constellations, FIG. 4 illustrates an analytical approach to designing an exemplary change detection orbit. As shown in FIG. 4, an analytical approach for determining the orbital parameters for groups of satellites in common change detection orbits is illustrated. For the purpose of illustration, the analysis presented herein is done for the most part for a spherical earth. However, in practice, the results presented for a spherical earth should be perturbed to account for such effects such as the earth's oblateness, the precession of the orbits of the satellite due to such effects and the precession of the earth due to the gravitational effects of the moon, sun, and other celestial bodies.

Altitudes selected for illustrating the novel approach for satellite constellation design will take the above noted effects of a spherical earth into account and will result in orbits with integer and non-integer numbers of traces in a 24-hour period. In the sections to follow, all of the above noted effects are taken into account to develop a practical preferred embodiment to this invention.

For example, for high levels of satellite coverage, any sparse distribution along the ground track will cease to exist. To illustrate this problem, a spherical earth will be assumed. This illustrates how rapidly the number of satellites will grow in the common ground track constellations, if the satellites are uniformly distributed along the ground tracks at hexagonally optimal spacings. Hexagonal optimum spacing, d, between satellites along the common ground track is given by:

$$d=\sqrt{3}r_0 \quad (1)$$

where $r_0$ is the radius of the coverage circle circumscribing the hexagon.

In an ideal spherical model of the earth, if a satellite orbits at a radius "a" (in km) then the number of orbits before repetition, k, satisfies the following equation:

$$k=1/\omega_e(\mu/a^3)^{0.5} \quad (2)$$

where $$\mu=\text{Kepler's gravitational constant}=3.986\times10^5 \text{ km}^3/\text{s}^2 \quad (3)$$

$$\omega_e=\text{Earth's rotation rate}=7.292\times10^{-5} \text{ rad/s} \quad (4)$$

for integer and non-integers values of k, then the satellite will orbit the earth exactly k times in a 24-hour period.

For example, FIG. 4 illustrates preferred definitions for a general change detection orbit. The "a" will determine the number of times that the satellite will orbit the earth in an 24 hour period. The satellite radius "a" is a combination of the earth's radius and the altitude of the satellite. Specifically, $a=R_e+h$, wherein $R_e$=the radius of the earth and h=the altitude of the satellite.

In essence, the present inventor has discovered that satellites having common ground tracks/paths are characterized by the following relationships:

$$RAAN_2=\text{mod}(RAAN_1+RAAN_0,2\pi) \quad (5)$$

$$2\pi F_2=\text{mod}(2\pi F_1-2\pi k\ RAAN_0,2\pi) \quad (6)$$

where mod( ) is the modular formula.

As shown in FIG. 4, $RAAN_1$ represents (in radians) the right ascension of ascending node for orbital plane 1; $RAAN_2$ represents (in radians) the right ascension of ascending node for orbital plane 2 (not shown); $RAAN_0$ represents (in radians) the longitude difference between orbital planes 1 and 2; $F_1$ represents the phasing parameter for orbital plane 1; and $F_2$ represents the phasing parameter for orbital plane 2. The right ascension of the ascending node is the angle from the vernal equinox to the ascending node. The ascending node is the point where the satellite passes through the equatorial plane moving from south to north. Right ascension is measured as a right-handed rotation about the pole, Z.

All satellites, that have the same $RAAN_1$, $F_1$, and k that satisfies the above equations (2)–(6), will have a common ground track. In other words, by starting with a predetermined value for $RAAN_1$, $F_1$ and the inclination, the difference between two adjacent satellites (placed in different orbital planes) can be calculated wherein a common ground track is achieved. First, the parameters for satellite 1 are designed, then the parameters for satellite 2 may be tabulated using modular arithmetic formulas (5) and (6). Formulas (5) and (6) rely on dividing the combination of the RAAN and the differential RAAN by $2\pi$ radians and looking for multiples of $2\pi$ radians, thereby achieving a common ground track.

Formulas (5) and (6) can also by expressed in terms of degrees wherein $2\pi$ radians can be replaced with 360°. If it is desired that all satellites be equally spaced, then one would take 360° and divide by the number of satellites. However, any arbitrary spacing between satellites can be derived.

Furthermore, unequal phasing may be chosen, which will make it difficult to predict the passage of the next satellite. In either case, satellite 1 and satellite 2 will follow the same track on the ground. Satellite 2 will substantially overlap the ground track made by the orbit of satellite 1.

By lining up the appropriate RAAN, inclination and phasing, a common ground track can be achieved. Furthermore, by varying the $RAAN_0$, the longitude difference between orbital planes 1 and 2, by any amount desired, satellite 1 and satellite 2 can be real close together or far apart. Exactly where the satellites should be placed may be determined so that their orbits will carve out the same ground track. Thereafter, by precisely synchronizing the images taken from the successive satellites traveling along this common ground track, very high precision (pixel level or better) change detection images can be achieved when pixel by pixel differences are taken of the successive images. The precision of the change detection images is characterized by the timing and frequency synchronized aboard the two spacecrafts.

The size of any coverage region, $r_0$, for a satellite depends on at least two factors, altitude, h, and minimum graze angle, $\phi$ in radians, and is given by:

$$\left(\frac{r_0}{R_e}\right) = \frac{\pi}{2} - \phi - a\sin\left[\frac{R_e}{R_e + h} \times \cos\phi\right] \quad (7)$$

where $R_e$=Earth's Radius=6378.14 km. Again for the purposes of this discussion, the graze angle is conveniently set to zero (however later in the disclosure it will be set to specific values of interest).

Below, Table 1 illustrates how the number of satellites and the coverage grows with fully populated common ground track (CGT) constellations as one approaches Low Earth Orbits (LEO) altitudes (below 2,700 km). Clearly as this table shows, if the object is to produce constellations with either 1-, 2- or 3-fold zonal coverage, then there may be an excess of satellites in the LEO CGT constellations that should be removed.

TABLE 1

| Common Ground Track Constellations | | | CGT | 1-Fold | 2-Fold | 3-Fold | 4-Fold | CGT |
|---|---|---|---|---|---|---|---|---|
| Independent Ground Tracks | Ideal Altitude (km) | Hexagonal Spacing (rads) | Fully Populated Nsats | 65 Deg Zonal Nsats | 65 Deg Zonal Nsats | 65 Deg Zonal Nsats | 65 Deg Zonal Nsats | Fully Populated Coverage |
| 0 | 35786.03 | 2.46 | 1 | 5 | 6 | 8 | 11 | 0 |
| 1 | 20183.62 | 2.30 | 3 | 5 | 7 | 10 | 14 | 0 |
| 2 | 13892.28 | 2.17 | 6 | 5 | 8 | 12 | 15 | 1 |
| 3 | 10354.72 | 2.04 | 10 | 6 | 9 | 14 | 17 | 2 |
| 4 | 8041.80 | 1.93 | 14 | 6 | 11 | 15 | 19 | 2 |
| 5 | 6391.42 | 1.81 | 18 | 7 | 12 | 18 | 21 | 3 |
| 6 | 5144.31 | 1.70 | 23 | 8 | 12 | 19 | 24 | 3 |
| 7 | 4162.90 | 1.60 | 28 | 9 | 14 | 21 | 26 | 4 |
| 8 | 3366.86 | 1.48 | 34 | 11 | 17 | 24 | 31 | 4 |
| 9 | 2705.86 | 1.37 | 42 | 12 | 18 | 29 | 36 | >4 |
| 10 | 2146.61 | 1.26 | 51 | 15 | 23 | 34 | 43 | >4 |
| 11 | 1666.18 | 1.13 | 61 | 18 | 28 | 41 | 53 | >4 |
| 12 | 1248.17 | 1.00 | 76 | 23 | 35 | 54 | 68 | >4 |
| 13 | 880.55 | 0.86 | 95 | 33 | 48 | 75 | 96 | >4 |
| 14 | 554.25 | 0.70 | 127 | 60 | 76 | >100 | >100 | >4 |
| 15 | 262.30 | 0.49 | 193 | 97 | >100 | >100 | >100 | >4 |

The term 1-, 2- or 3-fold zonal coverage relates to being able to see from the ground at least one, two or three satellites, respectively, at all times.

Table 2 below lists several graze angles and the corresponding satellite spacing and satellite count for an 1-fold, zonal-coverage between latitudes 65N and 65S. In practice, the graze angle is not necessarily zero. Instead, from an x-band radar clutter perspective, the minimum graze angle should be on the order of 6 degrees. However, from a tactical ground moving target indicator (GMTI) perspective, the graze angle should be selected consistent with the acceptable level of gaps in the coverage that the tracker can tolerate due to terrain obscuration, minimum detectable velocity constraints, and cross range accuracy constraints.

For the tactical GMTI case, for example, three graze angles have been arbitrarily selected to represent different levels of tracker performance (see Table 2): 14.6 degrees, 24.9 degrees, and 33.1 degrees. The graze angles will differ for various types of trackers. As shown in Table 2, the 1-fold coverage, graze angle equivalent values were developed for a MEO based tracker with minimum graze angle of 6 degrees, maximum graze angle of 70 degrees, cross range accuracy of less than 100 meters, and a minimum detectable velocity of less than 1 mps operating over a typical mountainous terrain. The 14.6-degree version failed to meet some of the tracker minimum requirements, the 24.9-degree version met all of the tracker minimum requirements and the 33.1-degree version exceeded all of the tracker minimum requirements. For comparative purposes, the use of the 1-fold coverage, graze angle equivalents is suggested as a means of characterizing the satellite count and coverage characteristics associated with various trackers across a wide range in altitudes.

Below, Table 2 lists for each of these graze angles the satellite spacing and satellite count for 1-fold, zonal-coverage between latitudes 65N and 65S.

Next, is provided a mathematical model for determining the number of groups and the number of satellites in a group for a preferred embodiment of this invention.

In a preferred embodiment, the inclination is set to 28.5 degrees with the assumption that the earth is oblate. This assumption will define a slightly different altitude to ground trace relationship than the case when the earth is seen as an ideal sphere. Other inclinations may be used, consistent with the coverage requirements. However, very slight changes in the altitude will result.

In another preferred embodiment of the present invention, a slight departure from the normal practice in CGT design is recommended to allow for multiple satellites carried by a

TABLE 2

| Graze Angle Equivalent | 0 Degrees | | 6 Degrees | | 14.6 Degrees | | 24.9 Degrees | | 33.1 Degrees | |
|---|---|---|---|---|---|---|---|---|---|---|
| CGT | | | 1-Fold | | 1-Fold | | 1-Fold | | 1-Fold | 1-Fold |
| Independent Ground Tracks | Ideal Altitude (km) | Satellite Spacing (rads) | 65 Deg Zonal Nsats | Satellite Spacing (rads) | 65 Deg Zonal Nsats | Satellite Spacing (rads) | 65 Deg Zonal Nsats | Satellite Spacing (rads) | 65 Deg Zonal Nsats | Satellite Spacing (rads) | 65 Deg Zonal Nsats |
| 0 | 35786.03 | 2.46 | 5 | 2.28 | 5 | 2.02 | 6 | 1.73 | 8 | 1.50 | 11 |
| 1 | 20183.62 | 2.30 | 5 | 2.12 | 5 | 1.87 | 7 | 1.59 | 9 | 1.37 | 12 |
| 2 | 13892.28 | 2.17 | 5 | 1.99 | 6 | 1.74 | 8 | 1.47 | 11 | 1.26 | 15 |
| 3 | 10354.72 | 2.04 | 6 | 1.87 | 7 | 1.62 | 8 | 1.36 | 12 | 1.16 | 16 |
| 4 | 8041.80 | 1.93 | 6 | 1.75 | 8 | 1.51 | 11 | 1.25 | 15 | 1.06 | 19 |
| 5 | 6391.42 | 1.81 | 7 | 1.64 | 11 | 1.41 | 12 | 1.15 | 17 | 0.97 | 23 |
| 6 | 5144.31 | 1.70 | 8 | 1.53 | 11 | 1.30 | 14 | 1.06 | 19 | 0.88 | 28 |
| 7 | 4162.90 | 1.60 | 9 | 1.42 | 12 | 1.20 | 16 | 0.96 | 24 | 0.80 | 34 |
| 8 | 3366.86 | 1.48 | 11 | 1.31 | 13 | 1.09 | 19 | 0.87 | 30 | 0.71 | 47 |
| 9 | 2705.86 | 1.37 | 12 | 1.20 | 15 | 0.99 | 23 | 0.77 | 39 | 0.63 | 63 |
| 10 | 2146.61 | 1.26 | 15 | 1.09 | 19 | 0.88 | 30 | 0.68 | 57 | 0.55 | 82 |
| 11 | 1666.18 | 1.13 | 18 | 0.97 | 24 | 0.76 | 41 | 0.58 | 75 | 0.46 | 115 |
| 12 | 1248.17 | 1.00 | 23 | 0.84 | 34 | 0.65 | 63 | 0.48 | 112 | 0.38 | 140 |
| 13 | 880.55 | 0.86 | 33 | 0.70 | 57 | 0.52 | 96 | 0.37 | 138 | 0.29 | 170 |
| 14 | 554.25 | 0.70 | 60 | 0.54 | 96 | 0.38 | 170 | 0.26 | | 0.20 | |
| 15 | 262.30 | 0.49 | 97 | 0.34 | | 0.21 | | 0.14 | | 0.10 | |

Fundamentally, in one aspect of the present invention, the satellites are coalesce into groups and then the groups are uniformly distributed along the common ground track. The satellites within a group are arranged so that hand-off occurs between adjacent satellites. Each group of satellites is sized to fully cover a single ground trace, where a single ground trace is a segment of the common ground track that contiguously extends 360 degrees in longitude. The choice of 360 degrees in longitude was made to ensure whole earth coverage without gaps. Other arrangements are possible with non-uniform distributions of the groups along the ground track that achieve whole earth coverage. This particular arrangement was merely chosen because of its simplicity.

The proposed arrangement leads to long periods of contiguous ground tracking approaching the orbital period, $$P=2\pi/(\omega_e k), \quad (8)$$

divided by $(k-1)/k$, (9)

where k is the total number of orbits around the earth that a satellite makes in one day, and high satellite revisit rates, $$R=P^*(k)/[N_g(k-1)] \quad (10)$$

where $N_g$ is the number of satellites in a group of satellites. This novel arrangement of satellites in a constellation leads to a highly efficient packing of the satellites.

single launch vehicle. For example, a CGT design for $N_{lv}$ satellites which may be carried by one launch vehicle will preferably collect the satellites into contiguous groups with a longitudinal extent of approximately $(360/N_{lv})$ degrees. Each contiguous group of satellites follows a different CGT, therefore there are $N_{lv}$ CGTs associated with the constellation.

$N_{lv}$ contiguous groups are arranged back-to-back (without any gaps) to form a so-called contiguous super-group. The super-group is a string of contiguous satellites with a longitudinal extent of 360 degrees. Gaps between the contiguous super-groups are uniformly distributed along the tracks.

A CGT design for $N_{lv}$ satellites carried by one launch vehicle is analogous to a CGT design for 1 satellite per launch vehicle where the super-groups of the former directly relate to the groups of the latter. The breakup of the super-group into smaller groups and how this breakup is preferably accomplished is one novel feature of this design process.

For example, the novel arrangement of satellites as presented herein allows the constellation to be populated from launch vehicles carrying multiple satellites and: (1) provides $N_{lv}$ successive periods of $(1/N_{lv})$ times an orbital period for performing coherent synthetic-aperture radar (SAR) change detection from $N_{lv}$ different looks, (2) simplifies handoff to between adjacent satellites along the contiguous common ground track and between adjacent contiguous common ground tracks, and (3) provides optimal satellite distribution for the desired level of ground coverage.

In addition, the novel constellation arrangement may be used for telecommunications and high precision DTED mapping and has the many benefits ascribed to CGT constellations.

Listed in Table 3 are the numbers of satellites per ground trace and the number of ground traces required to provide 1-fold zonal coverage (65S to 65N) at the graze angle equivalent values quoted. In essence, Table 3 lists the number of satellites per ground trace and the number of ground traces for a 1-fold zonal coverage (65S to 65N) when there is 1 satellite per launch vehicle.

The optimal spacing between elements should vary between hexagonal optimal spacing, see $d=\sqrt{3}r_0$ (1), and less than optimal rectangular spacing, $$d=\sqrt{2}r_0 \quad (13)$$

This condition lead to the usage of the ceiling function in the algorithms for determining integral numbers of satellites per ground trace and integral numbers of ground traces. The length of the satellite populated ground trace was set to 360 degrees in longitude, and gaps (where each gap is the same

TABLE 3

| Graze Angle Equivalent Practical | | 0 Degrees | | 6 Degrees | | 14.6 Degrees | | 24.9 Degrees | | 33.1 Degrees | |
|---|---|---|---|---|---|---|---|---|---|---|---|
| 1-Fold Coverage | | Number | Number | Number | Number | Number | Number | Number | Number | Number | Number |
| Independent Ground Tracks | 28.5 Deg Altitude (km) | of Sats Along Trace | of CG Traces Required | of Sats Along Trace | of CG Traces Required | of Sats Along Trace | of CG Traces Required | of Sats Along Trace | of CG Traces Required | of Sats Along Trace | of CG Traces Required |
| 0 | 35787.28 | 3 | 2 | 3 | 2 | 4 | 2 | 4 | 2 | 5 | 3 |
| 1 | 20184.16 | 3 | 2 | 3 | 2 | 4 | 2 | 4 | 3 | 5 | 3 |
| 2 | 13891.08 | 3 | 2 | 4 | 2 | 4 | 2 | 5 | 3 | 5 | 3 |
| 3 | 10350.96 | 4 | 2 | 4 | 2 | 4 | 2 | 5 | 3 | 6 | 3 |
| 4 | 8034.75 | 4 | 2 | 4 | 2 | 5 | 3 | 6 | 3 | 6 | 4 |
| 5 | 6380.42 | 4 | 2 | 4 | 2 | 5 | 3 | 6 | 3 | 7 | 4 |
| 6 | 5128.73 | 4 | 2 | 5 | 3 | 5 | 3 | 6 | 4 | 8 | 4 |
| 7 | 4142.16 | 4 | 3 | 5 | 3 | 6 | 3 | 7 | 4 | 8 | 5 |
| 8 | 3340.39 | 5 | 3 | 5 | 3 | 6 | 4 | 8 | 4 | 9 | 6 |
| 9 | 2673.11 | 5 | 3 | 6 | 3 | 7 | 4 | 9 | 5 | 11 | 6 |
| 10 | 2107.05 | 6 | 3 | 6 | 4 | 8 | 4 | 10 | 6 | 12 | 7 |
| 11 | 1619.27 | 6 | 3 | 7 | 4 | 9 | 5 | 12 | 7 | 14 | 9 |
| 12 | 1193.38 | 7 | 4 | 8 | 5 | 10 | 7 | 14 | 8 | 18 | 8 |
| 13 | 817.34 | 8 | 5 | 10 | 6 | 13 | 8 | 18 | 8 | 24 | 8 |
| 14 | 482.09 | 10 | 6 | 13 | 7 | 19 | 9 | 28 | | 37 | |
| 15 | 180.66 | 16 | | 24 | | 41 | | 65 | | 89 | |

The above Table 3 is generated based on the number of satellites per ground trace, $N_{sgt}$, being determined from $$N_{sgt}=\text{Ceiling}(2\pi/N_g,1) \quad (11)$$

where the ceiling function rounds up to the nearest integer, and the number of ground traces for 1-fold coverage, $N_{gt}$, being determined from $$N_{gt}=\text{Ceiling}(N_{sats}/N_{sgt},1) \quad (12)$$

where $N_{sats}$ is the number of satellites needed to provide a 1-fold, zonal coverage (65S to 65N), as given in Table 2. The ceiling functions guarantee minimum coverage requirements are either satisfied or exceeded.

size as any other gap) between these groups of satellites were chosen to ensure symmetrical coverage of the earth along the common ground track.

The satellite constellation and gap distribution (in the ECEF [Earth-Centered, Earth-Fixed] reference frame) is shown below in Table 4. Table 4 is also applicable to 1 satellite per launch vehicle. The size of the satellite and gap spacings is preferably set for 1-fold coverage. Similar results can be derived for n-fold coverage, using different satellite spacings. The satellite and gap distribution along the common ground tracks in this preferred embodiment illustrates a method for optimizing the constellation design according to the teachings of this invention.

TABLE 4

| Graze Angle Equivalent Practical | | 0 Degrees | | 6 Degrees | | 14.6 Degrees | | 24.9 Degrees | | 33.1 Degrees | |
|---|---|---|---|---|---|---|---|---|---|---|---|
| 1-Fold Coverage | | Satellite | Gap | Satellite | Gap | Satellite | Gap | Satellite | Gap | Satellite | Gap |
| Independent Ground Tracks | 28.5 Deg Altitude (km) | Spacing (Deg) (ECEF) | Size (Deg) (ECEF) | Spacing (Deg) (ECEF) | Size (Deg) (ECEF) | Spacing (Deg) (ECEF) | Size (Deg) (ECEF) | Spacing (Deg) (ECEF) | Size (Deg) (ECEF) | Spacing (Deg) (ECEF) | Size (Deg) (ECEF) |
| 0 | 35787.28 | | | | | | | | | | |
| 1 | 20184.16 | | | | | | | | | | |
| 2 | 13891.08 | 120.0 | 0.0 | 90.0 | 0.0 | 90.0 | 0.0 | | | | |
| 3 | 10350.96 | 90.0 | 180.0 | 90.0 | 180.0 | 90.0 | 180.0 | 72.0 | 0.0 | 60.0 | 0.0 |
| 4 | 8034.75 | 90.0 | 360.0 | 90.0 | 360.0 | 72.0 | 120.0 | 60.0 | 120.0 | 60.0 | 0.0 |
| 5 | 6380.42 | 90.0 | 540.0 | 90.0 | 540.0 | 72.0 | 240.0 | 60.0 | 240.0 | 51.4 | 90.0 |

TABLE 4-continued

| Graze Angle Equivalent Practical | | 0 Degrees | | 6 Degrees | | 14.6 Degrees | | 24.9 Degrees | | 33.1 Degrees | |
|---|---|---|---|---|---|---|---|---|---|---|---|
| 1-Fold Coverage | | Satellite | Gap | Satellite | Gap | Satellite | Gap | Satellite | Gap | Satellite | Gap |
| Independent Ground Tracks | 28.5 Deg Altitude (km) | Spacing (Deg) (ECEF) | Size (Deg) (ECEF) | Spacing (Deg) (ECEF) | Size (Deg) (ECEF) | Spacing (Deg) (ECEF) | Size (Deg) (ECEF) | Spacing (Deg) (ECEF) | Size (Deg) (ECEF) | Spacing (Deg) (ECEF) | Size (Deg) (ECEF) |
| 6 | 5128.73 | 90.0 | 720.0 | 72.0 | 360.0 | 72.0 | 360.0 | 60.0 | 180.0 | 45.0 | 180.0 |
| 7 | 4142.16 | 90.0 | 480.0 | 72.0 | 480.0 | 60.0 | 480.0 | 51.4 | 270.0 | 45.0 | 144.0 |
| 8 | 3340.39 | 72.0 | 600.0 | 72.0 | 600.0 | 60.0 | 360.0 | 45.0 | 360.0 | 40.0 | 120.0 |
| 9 | 2673.11 | 72.0 | 720.0 | 60.0 | 720.0 | 51.4 | 450.0 | 40.0 | 288.0 | 32.7 | 180.0 |
| 10 | 2107.05 | 60.0 | 840.0 | 60.0 | 540.0 | 45.0 | 540.0 | 36.0 | 240.0 | 30.0 | 154.3 |
| 11 | 1619.27 | 60.0 | 960.0 | 51.4 | 630.0 | 40.0 | 432.0 | 30.0 | 205.7 | 25.7 | 80.0 |
| 12 | 1193.38 | 51.4 | 720.0 | 45.0 | 504.0 | 36.0 | 257.1 | 25.7 | 180.0 | 20.0 | 180.0 |
| 13 | 817.34 | 45.0 | 576.0 | 36.0 | 420.0 | 27.7 | 225.0 | 20.0 | 225.0 | 15.0 | 225.0 |
| 14 | 482.09 | 36.0 | 480.0 | 27.7 | 360.0 | 18.9 | 200.0 | | | | |
| 15 | 180.66 | | | | | | | | | | |

As noted above, a prescription for CGT constellations based on 1 satellite per launch vehicle was laid out. Specifically, Tables 2–4 provide the minimum satellite spacing, minimum satellite count, the number of satellites per ground trace, the number of ground traces, and the satellite spacing and gap size required to provide 1-fold, zonal coverage (65S to 65 N) at the graze angle equivalent values quoted for the 1 satellite per launch vehicle scenario.

Below, Tables 5 and 6 lists the corresponding characteristics of CGT constellations based on 2 satellites per launch vehicle for easy comparison. Tables 3 and 5 were generated based on the number of satellites per group, $N_{group}$, being determined from $$N_{group} = \text{Ceiling}[2\pi/(N_g N_{lv}), N_{lv}] \quad (14)$$

and the number of ground super-groups for 1-fold coverage, $N_{gt}$, being determined from $$N_{gt} = \text{Ceiling}[N_{sats}/(N_{group} N_{lv}), 1] \quad (15)$$

where $N_{sats}$ is the number of satellites needed to provide 1-fold, zonal coverage (65S to 65N), as given in Table 2.

The ceiling functions guarantee minimum coverage requirements are either satisfied or exceeded. The optimal spacing between elements should vary between hexagonal optimal spacing, $d=\sqrt{3}r_0$ (1) (where $r_0$ is the coverage radius), and less than optimal rectangular spacing, $d=\sqrt{2}r_0$ (13). This condition lead to using the ceiling function in the algorithms for determining integral numbers of satellites per group and integral numbers of super-groups. The length of the super-group (contiguous satellite populated ground traces) was set to 360 degrees in longitude, and gaps (where each gap is the same size as any other gap) between these super-groups of satellites were chosen to ensure symmetrical coverage of the earth along the set of common ground tracks.

TABLE 5

| Graze Angle Equivalent Practical | | 0 Degrees | | 6 Degrees | | 14.6 Degrees | | 24.9 Degrees | | 33.1 Degrees | |
|---|---|---|---|---|---|---|---|---|---|---|---|
| 1-Fold Coverage | | Number of Sats in a Group | Number of CG Super Groups | Number of Sats in a Group | Number of CG Super Groups | Number of Sats in a Group | Number of CG Super Groups | Number of Sats in a Group | Number of CG Super Groups | Number of Sats in a Group | Number of CG Super Groups |
| Independent Ground Tracks | 28.5 Deg Altitude (km) | | | | | | | | | | |
| 0 | 35787.28 | 2 | 2 | 2 | 2 | 2 | 2 | 2 | 2 | 4 | 2 |
| 1 | 20184.16 | 2 | 2 | 2 | 2 | 2 | 2 | 2 | 3 | 4 | 2 |
| 2 | 13891.08 | 2 | 2 | 2 | 2 | 2 | 2 | 4 | 2 | 4 | 2 |
| 3 | 10350.96 | 2 | 2 | 2 | 2 | 2 | 2 | 4 | 2 | 4 | 2 |
| 4 | 8034.75 | 2 | 2 | 2 | 2 | 4 | 2 | 4 | 2 | 4 | 3 |
| 5 | 6380.42 | 2 | 2 | 2 | 2 | 4 | 2 | 4 | 3 | 4 | 3 |
| 6 | 5128.73 | 2 | 2 | 4 | 2 | 4 | 2 | 4 | 3 | 4 | 4 |
| 7 | 4142.16 | 2 | 3 | 4 | 2 | 4 | 2 | 4 | 3 | 4 | 5 |
| 8 | 3340.39 | 4 | 2 | 4 | 2 | 4 | 3 | 4 | 4 | 6 | 4 |
| 9 | 2673.11 | 4 | 2 | 4 | 2 | 4 | 3 | 6 | 4 | 6 | 6 |
| 10 | 2107.05 | 4 | 2 | 4 | 3 | 4 | 4 | 6 | 5 | 6 | 7 |
| 11 | 1619.27 | 4 | 3 | 4 | 3 | 6 | 4 | 6 | 7 | 8 | 8 |
| 12 | 1193.38 | 4 | 3 | 4 | 5 | 6 | 6 | 8 | 7 | 10 | 7 |
| 13 | 817.34 | 4 | 5 | 6 | 5 | 8 | 7 | 10 | 7 | 12 | 8 |
| 14 | 482.09 | 6 | 5 | 8 | 6 | 10 | 9 | 14 | | 20 | |
| 15 | 180.66 | 8 | | 12 | | 22 | | 34 | | 46 | |

The differences between the prescriptions provided in Tables 3 and 5 illustrate the conceptual differences in the constellation design. Also note the small differences in the total satellite count provided by these two constellations design approaches. In general, for LEO satellites (except at an altitude of 1619 km and for a 0 deg graze angle), there is a net cost savings (assuming the satellites cost approximately $100M each and launch vehicles cost approximately $85 M each, for example) for using the 2 satellites per launch vehicle over the 1 satellite per launch vehicle. This new constellation design can provide a net cost savings due to the implementation of 2 satellites per launch vehicle.

ground tracks is that the hand-off procedures between satellites and from satellites to ground stations is simplified.

The present invention also concentrates the satellite distribution into contiguous groups forming longitudinal lengths greater than or equal to 360 degrees. This concentration of the satellites into groups increases the satellite revisit rate, an important feature associated with image gathering for intelligence purposes. Gaps between the contiguous groups of satellites are uniformly distributed along the tracks. This uniform distribution helps to thins out the number of satellites in the constellation allowing low order

TABLE 6

| Graze Angle Equivalent Practical 1-Fold Coverage | | 0 Degrees | | 6 Degrees | | 14.6 Degrees | | 24.9 Degrees | | 33.1 Degrees | |
|---|---|---|---|---|---|---|---|---|---|---|---|
| Independent Ground Tracks | 28.5 Deg Altitude (km) | Satellite Spacing (Deg) (ECEF) | Gap Size (Deg) (ECEF) | Satellite Spacing (Deg) (ECEF) | Gap Size (Deg) (ECEF) | Satellite Spacing (Deg) (ECEF) | Gap Size (Deg) (ECEF) | Satellite Spacing (Deg) (ECEF) | Gap Size (Deg) (ECEF) | Satellite Spacing (Deg) (ECEF) | Gap Size (Deg) (ECEF) |
| 0 | 35787.28 | | | | | | | | | | |
| 1 | 20184.16 | | | | | | | | | | |
| 2 | 13891.08 | 90.0 | 0.0 | 90.0 | 0.0 | 90.0 | 0.0 | | | | |
| 3 | 10350.96 | 90.0 | 180.0 | 90.0 | 180.0 | 90.0 | 180.0 | 45.0 | 0.0 | 45.0 | 0.0 |
| 4 | 8034.75 | 90.0 | 360.0 | 90.0 | 360.0 | 45.0 | 120.0 | 45.0 | 120.0 | 45.0 | 0.0 |
| 5 | 6380.42 | 90.0 | 540.0 | 90.0 | 540.0 | 45.0 | 240.0 | 45.0 | 240.0 | 45.0 | 90.0 |
| 6 | 5128.73 | 90.0 | 720.0 | 45.0 | 360.0 | 45.0 | 360.0 | 45.0 | 180.0 | 45.0 | 180.0 |
| 7 | 4142.16 | 90.0 | 480.0 | 45.0 | 480.0 | 45.0 | 480.0 | 45.0 | 270.0 | 45.0 | 144.0 |
| 8 | 3340.39 | 45.0 | 600.0 | 45.0 | 600.0 | 45.0 | 360.0 | 45.0 | 360.0 | 30.0 | 120.0 |
| 9 | 2673.11 | 45.0 | 720.0 | 45.0 | 720.0 | 45.0 | 450.0 | 30.0 | 288.0 | 30.0 | 180.0 |
| 10 | 2107.05 | 45.0 | 840.0 | 45.0 | 540.0 | 45.0 | 540.0 | 30.0 | 240.0 | 30.0 | 154.3 |
| 11 | 1619.27 | 45.0 | 960.0 | 45.0 | 630.0 | 30.0 | 432.0 | 30.0 | 205.7 | 22.5 | 80.0 |
| 12 | 1193.38 | 45.0 | 720.0 | 45.0 | 504.0 | 30.0 | 257.1 | 22.5 | 180.0 | 18.0 | 180.0 |
| 13 | 817.34 | 45.0 | 576.0 | 30.0 | 420.0 | 22.5 | 225.0 | 18.0 | 225.0 | 15.0 | 225.0 |
| 14 | 482.09 | 30.0 | 480.0 | 22.5 | 360.0 | 18.0 | 200.0 | | | | |
| 15 | 180.66 | | | | | | | | | | |

The differences between Tables 4 and 6 also support the uniqueness of the proposed constellation design change that enables one to insert multiple satellites per launch vehicle into the constellation.

The methodologies shown herein are applicable to any number of satellites per launch vehicle that is reasonable. Exact spacings for the satellites within the groups and the gaps between super-groups of satellites are not necessarily required to make these constellations work. The preferred embodiments are used to illustrate the novel approach to constellation design and represents only a few of many variants to the approach intended to be covered by this disclosure.

The present invention at least shows that by departing from standard practice in constellation design, new constellation designs can be optimized for radar or telecommunication operation over the earth. Of particular benefits, as explained herein, is the use of common ground track constellations. Here, such common ground track constellations have been optimized so that satellites may travel over targets on common ground tracks (projections from space onto earth of the satellite trajectories.) Common ground track constellations are at least useful for performing high precision imagery such as change detection and, in its interferometric form, DTED mapping.

Furthermore, common ground track constellations that have daily repeating common ground tracks is also incorporated in this invention. One benefit of having repeating coverage (1-fold or more) to be achieved and provides symmetry to the constellation so that more uniform coverage of the earth can be achieved.

The present invention also enables the use of launch vehicles carrying multiple payloads to populate common ground track constellations. An immediate benefit to this multi-manifest launch is the savings in launch costs that can be accrued.

In addition, the present invention has all of the benefits attributed to common ground track constellations. Conventional practice of populating constellations at equal satellite spacings often lead to poor coverage and complicated hand-off procedures. This latter approach to constellation design is historically related to constellations made of planes of satellites of fixed inclination. However, the present invention illustrates that by departing from standard practice of constellation design, new constellation designs can be optimized for radar or telecommunication operation over the earth.

The above is not an exhaustive list of the benefits that this novel arrangement of satellites in common ground track constellations offer. Other benefits exist. This approach to satellite constellation design is extremely unique and can be applied to not only space-based radar and electro-optics applications, but also to telecommunications networks.

The above detailed description merely illustrates the principles of common ground track constellations and the applicability to space based SAR change detection. Other embodiments, such as for optical, UV, infrared or other imaging systems, are also feasible based on the principles of this invention and are considered to be within the spirit and scope of this disclosure.

This invention at least enables high precision (pixel level or better) change detection and differential SAR imagery. This type of imagery is very useful in detecting very slow moving objects and locating potential underground construction sites, a key reconnaissance activity for today's intelligence agencies.

Although preferred embodiments of the present invention have been described in detail herein, it should be understood that many variations and/or modifications of the inventive concepts herein taught still fall within the spirit and scope of the present invention.

What is claimed is:

1. A constellation of satellites having a common ground track, comprising:
   $N_g$ groups of satellites;
   $N_{sg}$ satellites in each $N_g$ group of satellites, wherein $N_g$ and $N_{sg}$ are integers;
   wherein gaps are distributed between the $N_g$ groups of satellites along the common ground track,
   wherein each $N_g$ group of satellites is sized to substantially cover a single ground trace,
   wherein the single ground trace is a segment of the common ground track that contiguously extends 360 degrees in longitude.

2. The constellation of satellites as set forth in claim 1, wherein the gaps distributed between the $N_g$ groups are uniformly distributed.

3. The constellation of satellites as set forth in claim 2, wherein there are extended periods of contiguous ground tracking approaching an orbital period represented by $P=2\pi/(\omega_e k)$, divided by $(k-1)/k$, where k is the total number of orbits around the earth that a single satellite makes in one day, and $\omega_e$ is the earth's rotation rate.

4. The constellation of satellites as set forth in claim 3, wherein a revisit rate to a target region is represented by $R=P*(k)/[N_g(k-1)]$.

5. The constellation of satellites as set forth in claim 1, wherein the $N_{sg}$ satellites in each $N_g$ group are arranged so that a hand-off occurs between adjacent satellites.

6. The constellation of satellites as set forth in claim 1, wherein the number of satellites per ground trace, $N_{sgt}$, is represented by $N_{sgt}$=Ceiling($2\pi/N_g$,1)

7. The constellation of satellites as set forth in claim 6, wherein the number of ground traces, $N_{gt}$, for a 1-fold zonal coverage is represented by $N_{gt}$=Ceiling ($N_{sats}/N_{sgt}$,1), where $N_{sats}$ is the number of satellites needed to provide the 1-fold zonal coverage as selected from Table 2 disclosed herein.

8. The constellation of satellites as set forth in claim 1, wherein a hexagonal optimal spacing, d, between $N_{sg}$ is between $d=\sqrt{3}r_0$ and $d=\sqrt{2}r_0$, where $r_0$ is the radius of the coverage circle circumscribing the hexagon.

9. The constellation of satellites as set forth in claim 1, further comprising change detection means for obtaining detection images for at least a particular region on the earth.

10. The constellation of satellites as set forth in claim 1, wherein a N-fold coverage can be achieved by adjusting the satellite spacing, where N is an integer or non-integer.

11. The constellation of satellites as set forth in claim 1, wherein the satellites are telecommunication satellites.

12. The constellation of satellites as set forth in claim 1, wherein optimized DTED mapping is achievable.

13. A method for arranging constellation of satellites having a common ground track, comprising:
    providing $N_g$ groups of satellites;
    providing $N_{sg}$ satellites in each $N_g$ group of satellites, wherein $N_g$ and $N_{sg}$ are integers;
    distributing gaps between the $N_g$ groups of satellites along the common ground track,
    wherein each $N_g$ group of satellites is sized to substantially cover a single ground trace,
    wherein the single ground trace is a segment of the common ground track that contiguously extends at least 360 degrees in longitude.

14. The method for arranging constellation of satellites as set forth in claim 13, wherein distributing the gaps includes distributing uniform gaps.

15. The method for arranging constellation of satellites as set forth in claim 14, further comprising providing extended periods of contiguous ground tracking approaching an orbital period (P) represented by $P=2\pi/(\omega_e k)$, divided by $(k-1)/k$, where k is the total number of orbits around the earth that a single satellite makes in one day, and $\omega_e$ is the earth's rotation rate.

16. The method for arranging constellation of satellites as set forth in claim 15, wherein said providing steps provide the satellites such that the satellites have a revisit rate (R) to a target region satisfying $R=P*(k)/[N_g(k-1)]$.

17. The method for arranging constellation of satellites as set forth in claim 13, wherein said providing steps provide the satellites such that said $N_{sg}$ satellites in each said $N_g$ group includes arranging the $N_{sg}$ satellites so that a hand-off occurs between adjacent satellites.

18. The method for arranging constellation of satellites as set forth in claim 13, wherein said providing steps provide the satellites such that the satellites have a number of satellites per ground trace, $N_{sgt}$, by satisfying $N_{sgt}$=Ceiling ($2\pi/N_g$,1).

19. The method for arranging constellation of satellites as set forth in claim 18, wherein said providing steps provide the satellites such that the satellites have a number of ground traces, $N_{gt}$, for a 1-fold zonal coverage is determined by satisfying $N_{gt}$=Ceiling ($N_{sats}/N_{sgt}$,1), where $N_{sats}$ is the number of satellites needed to provide the 1-fold zonal coverage as selected from Table 2 disclosed herein.

20. The method for arranging constellation of satellites as set forth in claim 13, wherein distributing the gaps includes a hexagonal optimal spacing, d, between $N_{sg}$ that is between $d=\sqrt{3}r_0$ and $d=\sqrt{2}r_0$, where $r_0$ is the radius of the coverage circle circumscribing the hexagon.

21. The method for arranging constellation of satellites as set forth in claim 13, further comprising using at least two satellites to obtain change detection images for at least a particular region on the earth.

22. The method for arranging constellation of satellites as set forth in claim 13, further comprising establishing a N-fold coverage by adjusting a satellite spacing, where N is an integer or an non-integer.

23. The method for arranging constellation of satellites as set forth in claim 13, wherein the satellites are telecommunications satellites.

24. The constellation of satellites as set forth in claim 13, further comprising performing DTED mapping.

25. A method for providing a constellation of satellites, having a plurality of common ground tracks, configured for multi-manifest launches, comprising:

carrying $N_{1v}$ satellites in a single launch vehicle, where $N_{1v}$ is at least two; and arranging the $N_{1v}$ satellites into $N_{lv}$ contiguous groups having a longitudinal extent of $360/N_{lv}$ degrees, each $N_{lv}$ contiguous group of satellites following a different ground track, wherein there are $N_{1v}$ contiguous common ground tracks associated with the constellation.

26. The method for providing constellation of satellites as set forth in claim 25, wherein said arranging step arranging the $N_{1v}$ contiguous groups back-to-back without any gaps to form a contiguous super-group.

27. The method for providing constellation of satellites as set forth in claim 26, wherein the super-group is a string of contiguous satellites having a longitudinal extent at least of 360 degrees.

28. The method of proving constellation of satellites as set forth in claim 27, wherein there are $N_{supg}$ super-groups arranged in the constellation, where $N_{supg}$ is an integer greater than or equal to two, said arranging step introducing uniformly distributed gaps between the $N_{supg}$ contiguous super-groups are along the $N_{1v}$ common ground tracks.

29. The method for providing constellation of satellites as set forth in claim 28, wherein the number of satellites per group, $N_{group}$, satisfies the following equation $N_{group}$=Ceiling[$2\pi/(N_g N_{lv})$, $N_{lv}$], where $N_g$ is the number of groups desired.

30. The method for providing constellation of satellites as set forth in claim 29, wherein the number of super-groups for a 1-fold coverage, $N_{gt}$, satisfies the following equation $N_{gt}$=Ceiling [$N_{sats}/(N_{group}N_{lv})$, 1], where $N_{sats}$ is the number of satellites needed to provide 1-fold zonal coverage.

31. The method of providing constellation of satellites as set forth in claim 25, wherein the constellation of satellites provides $N_{lv}$ successive periods represented by $(1/N_{1v})$ times an orbital period, the method further comprising performing coherent SAR change detection imagery from $N_{1v}$ different looks.

32. The method of providing constellation of satellites as set forth in claim 25, further comprising handing off imagery detection between adjacent satellites along the contiguous common ground track and between adjacent contiguous common ground tracks.

33. The constellation of satellites as set forth in claim 25, further comprising using at least some of the satellites in the constellation to perform one or more telecommunication application.

34. The method for providing constellation of satellites as set forth in claim 25, further comprising using at least some of the satellites in the constellation to perform DTED mapping applications.

* * * * *